United States Patent
Buschjohann et al.

(10) Patent No.: US 8,302,979 B2
(45) Date of Patent: Nov. 6, 2012

(54) FRONT-AXLE BRACKET FOR MOTOR VEHICLES

(75) Inventors: Thomas Buschjohann, Nordstemmen (DE); Heiko Kauert, Blankenfelde (DE); Juergen Eickmann, Schellerten (DE); Andreas Hennings, Heidelberg (DE); Andreas Buehrig-Polaczek, Aachen (DE); Lars Wuerker, Remscheid (DE); Klaus Greven, Hildesheim (DE)

(73) Assignee: KSM Castings GmbH, Hildesheim (DE)

( * ) Notice: Subject to any disclaimer, the term of this patent is extended or adjusted under 35 U.S.C. 154(b) by 0 days.

(21) Appl. No.: 12/800,030

(22) Filed: May 6, 2010

(65) Prior Publication Data

US 2010/0289239 A1 Nov. 18, 2010

Related U.S. Application Data

(63) Continuation of application No. PCT/DE2008/001817, filed on Nov. 5, 2008.

(30) Foreign Application Priority Data

| Nov. 8, 2007 | (DE) | 10 2007 053 159 |
| Dec. 28, 2007 | (DE) | 10 2007 063 319 |
| Apr. 30, 2008 | (DE) | 10 2008 021 792 |
| Oct. 9, 2008 | (DE) | 10 2008 050 886 |

(51) Int. Cl.
*B60G 7/00* (2006.01)

(52) U.S. Cl. ............. 280/124.109; 280/788; 280/781

(58) Field of Classification Search ........... 280/124.109, 280/788, 781
See application file for complete search history.

(56) References Cited

U.S. PATENT DOCUMENTS

| 5,562,308 A * | 10/1996 | Kamei et al. ............. 280/788 |
| 5,582,659 A | 12/1996 | Hashimoto et al. |
| 6,398,262 B1 * | 6/2002 | Ziech et al. ............. 280/785 |
| 6,752,885 B1 | 6/2004 | Jerichow |
| 7,584,815 B2 * | 9/2009 | Ogawa et al. ............. 180/312 |
| 7,946,377 B2 * | 5/2011 | Frasch et al. ............. 180/312 |

(Continued)

FOREIGN PATENT DOCUMENTS

DE 44 36 481 10/1996

(Continued)

OTHER PUBLICATIONS

John E. Hatch, "Aluminium Properties and Physical Metallurgy," 1984, American Society for Metals, US, Ohio, pp. 340-349, XP-002524400.

(Continued)

*Primary Examiner* — Drew Brown
(74) *Attorney, Agent, or Firm* — Collard & Roe, P.C.

(57) ABSTRACT

A front-axle bracket for motor vehicles has two accommodations spaced apart from one another in the longitudinal vehicle direction in each instance for the bearing locations for pivoting mounting of one or two wheel guide elements, in each instance, such as transverse control arms or A-arms, accommodations for attachment of the front-axle bracket as a pre-finished unit, together with pre-assembled assemblies, on the vehicle body, and at least individual ones of accommodations for attachment of the steering gear mechanism, for attachment of the stabilizer, and for mounting of a pendulum support. The front-axle bracket is produced as a component that is in one piece with these accommodations and connects them with one another. At least individual ones of the accommodations are integrated into the front-axle bracket by way of rod-shaped connecting elements, in framework-like manner.

27 Claims, 2 Drawing Sheets

U.S. PATENT DOCUMENTS

| | | | |
|---|---|---|---|
| 7,976,037 B2 * | 7/2011 | Yoshida et al. | 280/124.109 |
| 2003/0143102 A1 | 7/2003 | Matsuoka et al. | |
| 2004/0045638 A1 | 3/2004 | Garat et al. | |
| 2005/0134015 A1 * | 6/2005 | Ziech et al. | 280/124.109 |
| 2005/0155676 A1 | 7/2005 | Cosse et al. | |
| 2005/0224145 A1 | 10/2005 | Laslaz et al. | |
| 2008/0318081 A1 | 12/2008 | Steins | |
| 2009/0051154 A1 | 2/2009 | Eickmann et al. | |
| 2011/0215545 A1 * | 9/2011 | Buschjohann et al. | 280/124.109 |

FOREIGN PATENT DOCUMENTS

| | | |
|---|---|---|
| DE | 100 02 021 | 4/2001 |
| DE | 10 2006 042 377 | 3/2007 |
| DE | 10 2006 039 684 | 2/2008 |
| EP | 0 997 550 | 5/2000 |
| EP | 1 270 374 | 1/2003 |
| EP | 1 304 280 | 4/2003 |
| EP | 1 386 827 | 2/2004 |
| EP | 1 413 636 | 4/2004 |
| EP | 1 504 983 | 2/2005 |
| EP | 1 787 894 | 5/2007 |
| FR | 2 841 164 | 12/2003 |
| JP | 54-013407 | 1/1979 |
| JP | 07-109537 | 4/1995 |
| JP | 09-272941 | 10/1997 |
| JP | 10-096039 | 4/1998 |
| JP | 10-110231 | 4/1998 |
| JP | 2002-047524 | 2/2002 |
| JP | 2003-170263 | 6/2003 |
| WO | WO 90/05083 | 5/1990 |
| WO | WO 02/26548 | 4/2002 |
| WO | WO 03/006698 | 1/2003 |
| WO | WO 2005/108633 | 11/2005 |
| WO | WO 2007/025528 | 3/2007 |
| WO | WO 2007/031060 | 3/2007 |

OTHER PUBLICATIONS

International Search Report of PCT/DE2008/001817.
English translation of the International Preliminary Report on Patentability and Written Opinion of the International Searching Authority.
DIN 50125, Jul. 2009, pp. 1-14.
DIN EN 10 002, 1990-1991.
L. F. Mondolfo, Alluminum Alloys: Structure and Properties, eds. Butterworths, 1976, pp. 566-569.
Aluminum Laufen AG, Legierungen für Kokillenguss and Niedergdruckguss, Mar. 14, 2006, Internet URL: http://www.alu-laufen.ch/data/quss_quss_docs//LeqListe_Guss_Verkauf.V3b.dt.pdf.
Sharma et al., "Influence of silicon (wt. %) and heat treatment on abrasive wear behaviour of cast Al-Si-Mg alloys," Materials Science and Engineering, vol. A408 (2005) pp. 274-280. XP-002412681.
"Hüttenaluminium Gusslegierungen," 1994, Aluminium Rheinfelden GmbH, XP-002412683.

* cited by examiner

FRONT-AXLE BRACKET FOR MOTOR VEHICLES

CROSS REFERENCE TO RELATED APPLICATIONS

Applicants claim priority on and this application is a continuation under 35 U.S.C. 120 of International Application No. PCT/DE2008/001817 filed on Nov. 5, 2008, which claims priority under 35 U.S.C. 119 of German Application No. 10 2007 053 159.3 filed on Nov. 8, 2007, German Application No. 10 2007 063 319.1 filed on Dec. 28, 2007, German Application No. 10 2008 021 792.1 filed on Apr. 30, 2008, and German Application No. 10 2008 050 886.1 filed on Oct. 9, 2008. The International Application under PCT Article 21(2) was not published in English. Applicants also claim priority under 35 U.S.C. 119 of German Application No. 10 2007 053 159.3 filed on Nov. 8, 2007, German Application No. 10 2007 063 319.1 filed on Dec. 28, 2007, German Application No. 10 2008 021 792.1 filed on Apr. 30, 2008, and German Application No. 10 2008 050 886.1 filed on Oct. 9, 2008. The disclosure of the aforesaid International Application and German applications are incorporated by reference.

BACKGROUND OF THE INVENTION

1. Field of the Invention

The present invention relates to a front-axle bracket for motor vehicles.

2. Description of the Related Art

Such brackets, which are also referred to as saddles, frames, or auxiliary frames, are attached to vehicle structures, for example to the car body and/or to longitudinal supports of a vehicle, as pre-assembled units or modules, after they have been provided with assemblies or auxiliary assemblies.

A front-axle bracket is disclosed, for example, in WO 2007/031060 A1, which goes back to the same applicant.

SUMMARY OF THE INVENTION

Proceeding from this state of the art, it is an object of the invention to further optimize a front-axle bracket of the type stated initially with regard to weight and costs, without the optimization of the front-axle bracket having a disadvantageous effect on the chassis kinematics.

In this connection, it is a further object of the invention to provide a front-axle bracket of the type stated initially, which demonstrates improved rigidity, particularly in the transverse direction, in order to absorb the high static and dynamic forces that engage on the front-axle bracket. Furthermore, such a front-axle bracket is intended to be configured to be particularly resistant to bending and twisting.

In this connection, it is another object of the invention to provide such a front-axle bracket that demonstrates particularly great strength and withstands long-term stresses, particularly also at its linking or connecting parts, or its accommodations or recesses.

In this connection, it is another object to provide a front-axle bracket of the type stated initially, which optimally withstands or absorbs spring forces or damping forces that occur during driving operation, as well as tensile surges and pressure surges.

In this connection, it is a further object of the invention to provide a front-axle bracket of the type stated initially, which accommodates as many parts that belong to the chassis and/or the power train as possible, which cannot be directly attached to the car body structure for reasons of requirements concerning assembly, car body stress, comfort, and stiffness. In particular, a front-axle bracket of the type stated is intended to be made available, which allows pre-assembly and pre-adjustment or adjustment of these parts in a module, in particularly simple manner, and then can be attached to the car body structure in particularly simple manner. In particular, the maintenance, repair, assembly, and disassembly of these parts are also intended to be facilitated. Furthermore, a front-axle bracket of the type stated initially is intended to be made available, which requires only a small amount of construction space in the motor vehicle.

Another object of the invention is to provide a front-axle bracket of the type stated, which better damps the transfer of noise and vibration, particularly vibrations of assemblies. Furthermore, it must meet the requirements concerning inherent frequency. Also, a front-axle bracket is intended to be made available that demonstrates optimized behavior in the event of a crash.

These and other objects are achieved, in accordance with the invention, by a front-axle bracket for motor vehicles, in which two accommodations spaced apart from one another in the longitudinal vehicle direction are provided, in each instance, for the bearing locations for pivoting mounting of one or two wheel guide elements, in each instance, such as transverse control arms or A-arms, and accommodations for attachment of the front-axle bracket as a pre-finished unit, together with pre-assembled assemblies, on the vehicle body, are provided, as well as at least individual ones of the accommodations listed below, for attachment of the steering gear mechanism, attachment of the stabilizer, and mounting of a pendulum support. The front-axle bracket is produced as a component that is in one piece with these accommodations and connects them with one another. At least individual ones of the accommodations are integrated into the front-axle bracket by way of rod-shaped connecting elements, in framework-like manner. Further developments and advantageous embodiments of the invention are discussed below.

Because at least some of the accommodations are integrated into the front-axle bracket by way of rod-shaped connecting elements, in framework-like manner, material and therefore weight of the vehicle itself are saved, along with fuel, for one thing, and for another, the transport costs and the spring-mounted masses can be reduced.

The rod-shaped connecting elements, which essentially delimit compartments without material, ensure the required rigidity in this connection, without any disadvantageous influence on the chassis kinematics. In this regard, the rod-shaped connecting elements can also be referred to as rod-shaped reinforcement elements.

When accommodations are mentioned within the scope of the present invention, this term also includes recesses.

In a further embodiment of the invention, two, preferably four, particularly preferably six, further particularly preferably eight, further particularly preferably ten of the accommodations are integrated into the front-axle bracket by way of rod-shaped connecting elements, in framework-like manner, preferably directly connected with one another.

As a result, further weight can advantageously be saved, whereby the required rigidity of the front-axle bracket is maintained. By means of such an embodiment, optimal strength values can be implemented, with the lowest possible use of material.

It is advantageously provided that the rear accommodation, in the direction of travel, for mounting of each of the wheel guide elements, possesses accommodation elements that are spaced apart, at least approximately vertical to the longitudinal vehicle axis, for enclosing and holding the rear bearing, in the direction of travel, on the wheel guide element. Preferably, each accommodation element is integrated into the front-axle bracket by way of at least one, preferably at least two rod-shaped connecting elements. Such an accommodation, which uses little material, fulfills its task without any negative influence on the required integration into the front-axle bracket.

Preferably, at least one, preferably every accommodation element is connected, by way of a rod-shaped connecting element, with a first accommodation for attachment means for fixing the front-axle bracket in place on the vehicle body.

In an advantageous embodiment of the invention, at least one accommodation element is connected, by way of a rod-shaped connecting element, with the front accommodation, in the direction of travel, for mounting of each of the wheel guide elements, whereby the rod-shaped connecting element preferably runs approximately in the longitudinal vehicle direction.

It is practical if the front accommodation, in the direction of travel, for mounting of each of the wheel guide elements, possesses two accommodation elements spaced apart at least approximately in the longitudinal vehicle axis, for enclosing the front bearing, in the direction of travel, in U shape and holding it on the wheel guide element.

It is advantageous if the front-axle bracket has at least one reinforcement element in the transverse direction, between the front accommodations, in the direction of travel, for mounting of each of the wheel guide elements, preferably in the form of a horizontally disposed surface element.

Such a reinforcement element absorbs the forces that act on the aforementioned accommodations in the transverse direction. Because the reinforcement element is configured in planar manner, the rigidity of the front accommodation element, in the direction of travel, of the aforementioned accommodation is furthermore increased, with the lowest possible use of material. Furthermore, such a reinforcement element can be disposed in such a manner that other assemblies, particularly engine and transmission, can be positioned close to the front-axle bracket. In this way, less construction space is required.

The horizontally disposed surface element is preferably configured to be level. The edge of the surface element that faces in the direction of travel can additionally or alternatively have an indentation in a semi-oval shape.

Furthermore, the horizontally disposed surface element may be disposed in a plane underneath the bores provided in the accommodation elements.

Assemblies, particularly engine and transmission, can thereby be positioned very close to the front-axle bracket, so that less construction space is required in the vehicle.

Preferably, a first accommodation for attachment of the front-axle bracket to the vehicle body is provided, which forms the rear end of the front-axle bracket, in the direction of travel.

Preferably, a second accommodation for attachment of the front-axle bracket to the vehicle body is provided, which is disposed integrated into a side arm, in the immediate vicinity of the front accommodation, in the direction of travel.

It is advantageous if the front-axle bracket has an approximately central planar reinforcement element that directly follows the accommodation for mounting of the pendulum support, at least in part, and widens opposite the direction of travel.

By means of such an embodiment, optimal strength values can be implemented with the least possible use of material. Such an embodiment particularly counters vertical vibrations.

Preferably, the planar reinforcement element is delimited, at least in part, by reinforcement ribs.

Furthermore, the planar reinforcement element may form a type of bead toward the rear edge, opposite the direction of travel, which bead is configured to be hollow on the underside and possesses a V cross-section.

By means of such an embodiment, optimal strength values can be implemented, with the least possible use of material.

It is advantageous if the planar reinforcement element has node points at the rear edge, opposite the direction of travel, in which at least individual, preferably multiple rod-shaped connecting elements run together.

In an advantageous embodiment of the invention, the first accommodation for attachment of the front-axle bracket to the vehicle body is connected with the planar reinforcement element by way of at least one rod-shaped connecting element.

Furthermore, it is advantageous to provide at least one reinforcement rib on the planar reinforcement element, which rib is preferably disposed, in the longitudinal vehicle direction, at least partly between the rear edge of the planar reinforcement element and the accommodation for mounting of the pendulum support.

It is advantageous if the front-axle bracket is produced from light metal, preferably from an aluminum alloy. Furthermore, it can be advantageous if the component is produced using an aluminum casting process, preferably using the chill-casting process, particularly preferably using the horizontal casting process or tilted chill-casting process.

In an advantageous embodiment, the area of the compartments delimited by the rod-shaped connecting elements is greater, in a top view of the front-axle bracket, than the area of the front-axle bracket through which there is no passage, in a top view of the front-axle bracket, preferably at least greater than the area of the reinforcement element through which there is no passage, in a top view of the front-axle bracket.

Furthermore, it is advantageous if the front-axle bracket only has two other accommodations for attachment of the steering gear mechanism.

According to a further embodiment, the accommodations for attachment of the steering gear mechanism and/or the accommodations for attachment of the stabilizer are linked with the rod-shaped connecting elements by way of cross-pieces.

In a front-axle bracket for motor vehicles, in which two accommodations spaced apart from one another in the longitudinal vehicle direction are provided, in each instance, for the bearing locations for pivoting mounting of one of two wheel guide elements, in each instance, such as transverse control arms or A-arms, and accommodations for attachment of the front-axle bracket as a pre-finished unit, together with pre-assembled assemblies, on the vehicle body, are provided, as well as at least individual ones of the accommodations listed below, for
  attachment of the steering gear mechanism,
  attachment of the stabilizer,
  mounting of a pendulum support,
and the front-axle bracket is produced as a component that is in one piece with these accommodations and connects them with one another, weight-reducing recesses in the form of perforations and/or cavities that are open on one side preferably remain in the front-axle bracket, without any disadvantageous influence on the chassis kinematics.

Furthermore, at least individual ones of the accommodations may be at least partly integrated into the front-axle bracket and/or connected with one another by way of rod-shaped and/or surface-shaped connecting elements.

Furthermore, at least individual ones of the accommodations may be at least partly integrated and/or connected with one another by way of open-profile-shaped connecting elements, particularly ones having a cross-section essentially in the shape of a T, U, V, L, X, Y, S, Z and/or double T.

Furthermore, the open-profile-shaped connecting elements may be oriented differently, preferably horizontally or vertically.

It is practical if individual shanks of the open-profile-shaped connecting elements are designed as reinforcement ribs.

It is particularly advantageous if the connecting elements have additional reinforcement ribs, belts, beading, beads, crosspieces and/or perforations.

Preferably, the rear accommodation, in the direction of travel, for mounting of each of the wheel guide elements, possesses accommodation elements that are spaced apart, at least approximately vertical to the longitudinal vehicle axis, for surrounding and holding the rear bearing, in the direction of travel, of the wheel guide element. The accommodation elements are connected with one another by way of a U-shaped tab and are integrated into the front-axle bracket.

Furthermore, the tab may have a reinforced edge, at least in part, preferably on its outside.

It is practical if the tab is connected with a first accommodation for attachment means for fixing the front-axle bracket in place on the vehicle body, by way of at least one connecting element.

Furthermore, the tabs may be connected with the first accommodations, and the first accommodations may be connected with one another, by way of a single rod-shaped or open-profile-shaped connecting element, whereby the open-profile-shaped connecting element preferably has a U-shaped cross-section.

Furthermore, at least one, preferably two accommodations for attachment means for fixing the exhaust system in place may be provided on the connecting element that connects the first accommodations with one another, preferably on the side that faces opposite the direction of travel.

Furthermore, the accommodations for attachment means for fixing the exhaust system in place and/or the first accommodations may be integrated into and/or onto the side wall that faces opposite the direction of travel, which is formed by one of the shanks of the U-shaped connecting element, and/or onto and/or into a planar reinforcement lip that follows it.

It is particularly advantageous if the connecting element that connects the first accommodations with one another has a planar reinforcement lip, disposed essentially horizontally, on its underside, in and/or opposite the direction of travel.

Furthermore, reinforcement ribs may be provided within the profile-shaped connecting elements that connect the accommodations, tabs and/or first accommodations, which ribs preferably lead from one side wall to the other side wall, straight or in zigzag shape, and/or preferably lead from the accommodations disposed in and/or on the one side wall to the opposite side wall, preferably at a slant and/or preferably in opposite directions.

Furthermore, the tab that connects the accommodation elements may be connected with the accommodation for attachment of the steering gear mechanism, disposed in the direction of travel, by way of a connecting element.

Furthermore, the accommodation for attachment of the steering gear mechanism may be connected with the second accommodation for attachment of the front-axle bracket to the vehicle body, disposed in the direction of travel, by way of a connecting element that is preferably at least partly rod-shaped. This accommodation, in turn, is directly connected with the front accommodation for mounting of each of the wheel guide elements, preferably integrated into a side arm.

Advantageously, one of the accommodations for attachment of the stabilizer may be linked with the connecting element that connects the accommodation for attachment of the steering gear mechanism with the second accommodation or the side arm, respectively.

The front accommodation for mounting of each of the wheel guide elements, in the direction of travel, may furthermore possess two accommodation elements that are spaced apart at least approximately in the longitudinal vehicle axis, for enclosing and holding the front bearing of the wheel guide element, in the direction of travel, in U shape. The one accommodation element preferably follows the side arm of the accommodation directly, and the other accommodation element is integrated within the short shank of an L-shaped tab, which preferably follows the side arm with its end that does not have the accommodation element.

Preferably, the tab has a reinforced edge at least in part, preferably on its outer side.

In a further embodiment, the side arm has a recess that is introduced on one or both sides.

Preferably, the side arm has a recess that goes through.

In an advantageous embodiment of the invention, an accommodation for attachment of the stabilizer is provided within the recess, which accommodation is connected with the inner wall of the side arm, preferably by way of a crosspiece, in the case of a cavity that goes through, or is integrated into the remaining surface, in the case of a cavity that does not go through, and is preferably disposed directly on the inner wall of the side arm and/or connected with the inner wall(s) or reinforcement surfaces of the side arm, preferably provided with at least one reinforcement rib.

It is practical if the front-axle bracket has a reinforcement element that connects the side arms in the transverse direction, in which or on which element the accommodation for mounting of the pendulum support is disposed.

Furthermore, the reinforcement element may be configured in rod shape.

Preferably, the reinforcement element is configured in the shape of an open profile, particularly having a cross-section essentially in the shape of a T, U, V, or L, whereby preferably, the edges and borders of the reinforcement element are at least partially reinforced. Preferably, in the region of the accommodation for mounting of the pendulum support, the reinforcement element has at least one, preferably two reinforcing slanted surfaces, namely one on each side of the accommodation, in each instance, connected with it, which surface preferably drops downward from an essentially horizontally disposed partial surface of the reinforcement element, opposite the direction of travel.

In a further embodiment, one or more horizontally disposed, planar reinforcement lips are disposed on the side facing in and/or opposite the direction of travel.

It is advantageous if the horizontally disposed reinforcement lip is configured to be level.

It is practical if the horizontally disposed reinforcement lip is disposed in a plane underneath the bores provided in the accommodation elements.

Furthermore, one of the accommodations for attachment of the steering gear mechanism may be connected with the reinforcement element by way of a preferably rod-shaped connecting element.

Furthermore, the first accommodation for attachment of the front-axle bracket to the vehicle body may form the rear end of the front-axle bracket.

It is advantageous if the accommodation for mounting of the pendulum support has a connecting element that runs in the direction of one of the first accommodations, and is directly or indirectly connected with it.

Furthermore, the accommodation for mounting of the pendulum support may be connected with one of the accommodations for attachment of the steering gear mechanism by way of a connecting element.

Preferably, the reinforcement element has node points at the ends that lead to the side arms, in which at least individual, preferably multiple preferably rod-shaped connecting elements run together.

Furthermore, the front-axle bracket may be produced from light metal, preferably from an aluminum alloy.

It is advantageous if the component is produced using a light-metal, preferably aluminum casting method, particularly preferably using the chill-casting method.

Furthermore, the area of the recesses delimited by the connecting elements may be greater, in a top view of the front-axle bracket, than the area of the front-axle bracket through which there is no passage, in a top view of the front-axle bracket.

According to a further embodiment of the invention, the front-axle bracket has two accommodations for attachment of the steering gear mechanism.

Preferably, the accommodations for attachment of the steering gear mechanism and/or the accommodations for attachment of the stabilizer are linked with the rod-shaped connecting elements by way of crosspieces.

Preferably, the front-axle bracket according to the invention consists of an aluminum (Al) casting alloy as disclosed in WO 2007/025528 A2. The disclosure content of this publication is incorporated into this application, by an explicit statement that it belongs to the object of the present application.

Preferably, the front-axle bracket consists of an Al casting alloy that contains at least five of the alloy components listed below Si: 2.5 to 3.3, preferably 2.7 to 3.1 wt.-%
Mg: 0.2 to 0.7, preferably 0.3 to 0.6 wt.-%
Fe: <0.18, preferably 0.05 to 0.16 wt.-%
Mn: <0.5, preferably 0.05 to 0.4 wt.-%
Ti: <0.1, preferably 0.01 to 0.08 wt.-%
Sr: <0.03, preferably 0.01 to 0.03 wt.-%
Other: <0.1 wt.-%
and, in addition, Cr in an amount that increases the strength of the alloy, as another alloy component, supplemented to 100 wt.-% with Al, in each instance.

Preferably, the front-axle bracket consists of an Al casting alloy that contains at least five of the alloy components listed below Si: 2.5 to 3.3, preferably 2.7 to 3.1 wt.-%
Mg: 0.2 to 0.7, preferably 0.3 to 0.6 wt.-%
Fe: <0.18, preferably 0.05 to 0.16 wt.-%
Mn: <0.5, preferably 0.05 to 0.4 wt.-%
Ti: <0.1, preferably 0.01 to 0.08 wt.-%
Sr: <0.03, preferably 0.01 to 0.03 wt.-%
Cr: 0.3 to 1.3, preferably 0.4 to 1.0, particularly preferably 0.5 to 0.8 wt.-%
Other: <0.1 wt.-%
and is supplemented to 100 wt.-% with Al, in each instance.

Such an Al casting alloy is stronger, more impact-resistant, and more ductile as compared with the state of the art.

The preferred alloying-in of Cr in the amounts stated leads to a significant improvement in the mechanical properties, which can already be recorded in the casting state, but particularly after solution annealing and aging, if applicable.

In particular, it has been shown that undesirable iron precipitates can be transformed into a more advantageous morphology, already in the casting state, by means of such additions of chrome.

For chassis applications, particularly for wheel-guiding components, overall increased mechanical characteristic values can be obtained in this manner.

The alloys according to the invention can contain contaminants that result from production, for example Pb, Ni, Zn, etc. as they are generally known to a person skilled in the art.

In an advantageous embodiment of the invention, CuNi is contained as an additional alloy component, by being alloyed in at the same time. It has been shown that additions of copper or nickel alone do not lead to any significant improvement in the mechanical properties. Alloying in copper and nickel at the same time, however, opens up new possibilities for use of the alloy, particularly in the area outside of the chassis, for components subject to temperature stress.

The alloys according to the invention demonstrate an improved strength/expansion ratio as compared with known Al casting alloys.

Fundamentally, a permanent-mold casting method is suitable as a production method for work pieces, components, or parts for or of chassis parts of motor vehicles, in particular, from the casting alloy according to the invention. Because of the very good mechanical properties in the case of work pieces, components, or parts that are subject to great stress, gravity chill-casting and low-pressure chill-casting are particularly suitable as production methods. In this connection, the counter-pressure chill-casting process (CPC process) has proven to be particularly preferred.

It can furthermore be advantageous if the alloy has a fine grain. For this purpose, so-called grain refiners are added to the alloy. Grain refinement is a melt treatment, whereby the term "grain refinement" is understood to mean an artificial increase in the number of seed crystals in the melt, which is brought about by means of the introduction and distribution of outside seed crystals. In this way, better feed capacity by means of improved mass feed, in particular, improved mold-filling and flow capacity, a reduction in the tendency to develop porosity and heat cracks, and a resulting increase in ductility, as well as a better surface composition of the casting alloy are achieved.

In order to achieve the advantages mentioned above or to develop them even further, it is advantageous if the cast components are heat-treated, particularly with the following parameters:

Solution annealing 490 to 540° C. for 1 to 10 hours
Annealing 150 to 200° C. for 1 to 10 hours For some application cases, however, it can also be advantageous to undertake only a one-step annealing treatment, generally known as T4, T5, or 0, for example.

An increase in strength of the castings can advantageously be achieved by means of quenching the castings in water, while they are still hot, instead of allowing them to cool off slowly in air.

Aside from the advantages that have already been mentioned, which components composed of alloys according the invention demonstrate, the corrosion resistance is also significantly increased, due to the absence of the alloy components Cu and Zn. The product is also relatively inexpensive, because no alloy additives that would make it more expensive, such as Rare Earth (RE) metals, for example, are used, the usual melt treatment can be applied, and no special effort is required for separation of circuits. Likewise, for cost reasons, preferably no Ag is used as an alloy component.

Also, an excellent strength/expansion ratio is present, with excellent castability. The castability allows a casting that is free of large defects, known as blowholes, for one thing, and for another, the microstructure is positively influenced, in such a manner that the number of internal notches, which reduce elongation to fracture, is kept as low as possible.

The mold-filling capacity is also improved in the presence of Cr, according to the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
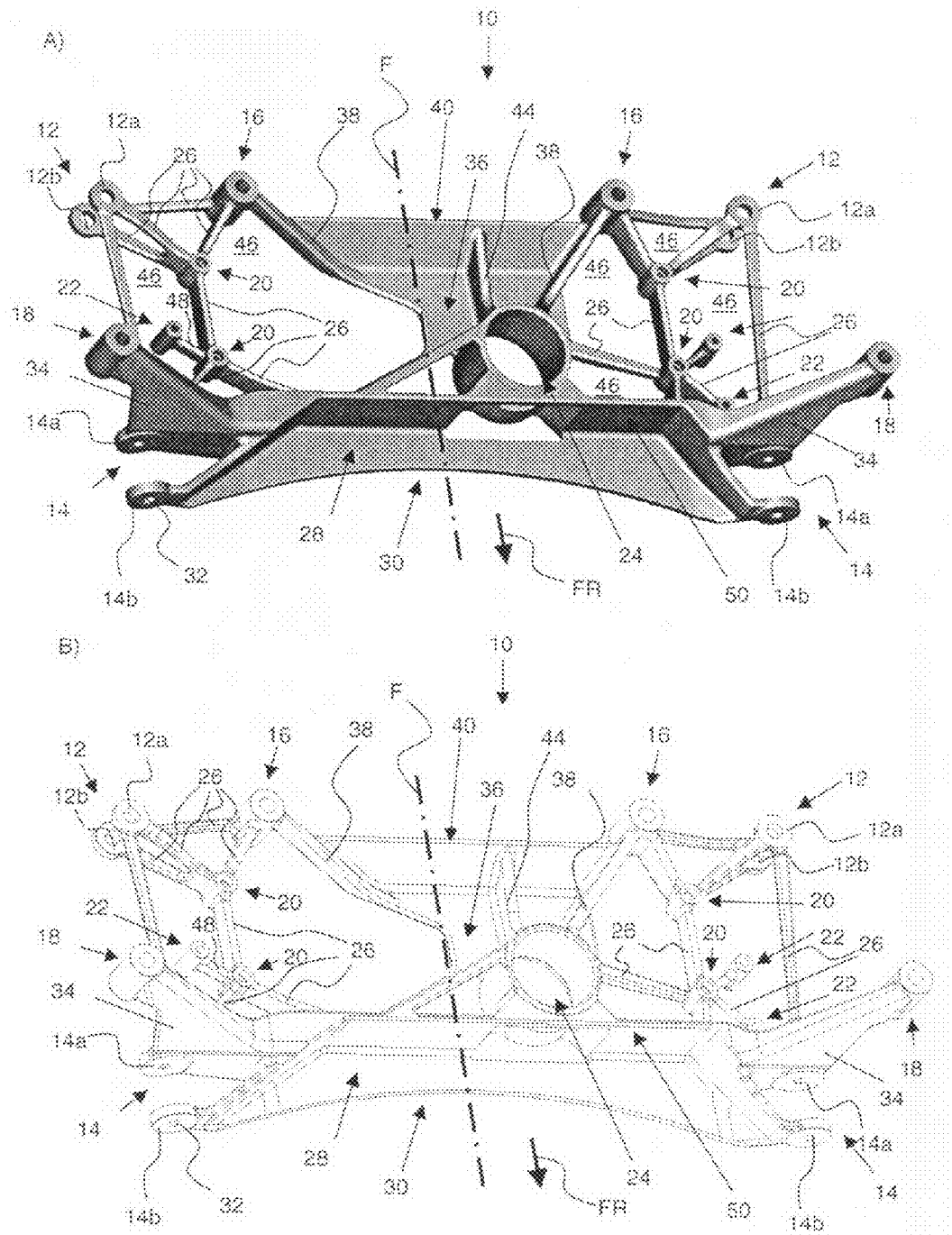
FIG. 1 is a perspective representation, from above, of a first exemplary embodiment for a front-axle bracket according to the invention, in A) a lightly shaded representation, and B) as a line drawing.
Figure 2:
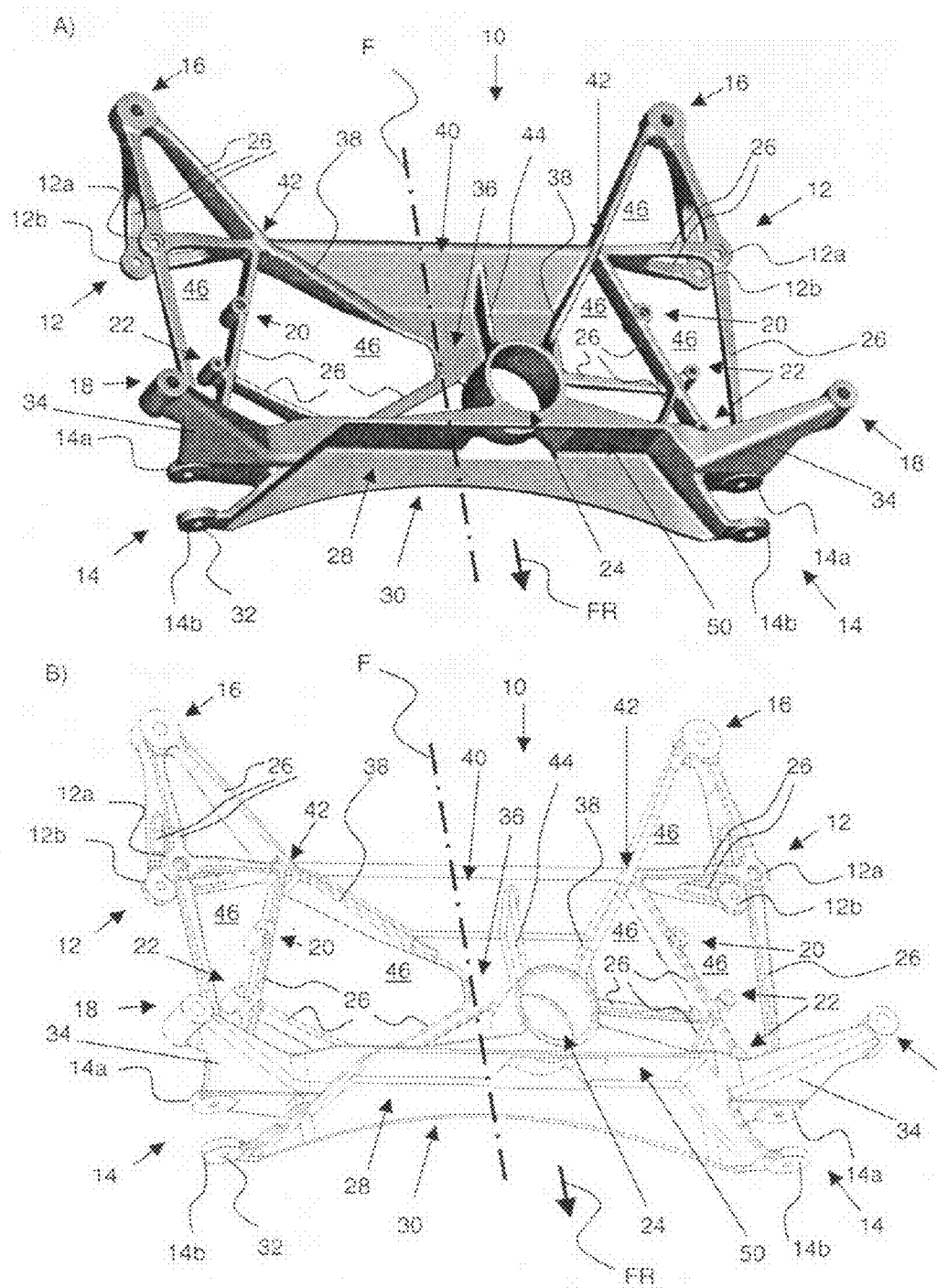
FIG. 2 is a perspective representation, from above, of a second exemplary embodiment for a front-axle bracket according to the invention, in A) a lightly shaded representation, and B) as a line drawing.

Referring now in detail to the drawings, the front-axle brackets 10 for motor vehicles shown in FIGS. 1 and 2 comprise, in each instance, two accommodations 12, 14 for the bearing locations for pivoting mounting of one each of two transverse control arms, not shown here, which accommodations are spaced apart from one another in the longitudinal vehicle direction F. Furthermore, two first accommodations 16 and two second accommodations 18, in each instance, are provided for attachment of the front-axle bracket 10 on the vehicle body.

Each front-axle bracket 10 furthermore has an accommodation 24 for mounting of a pendulum support, not shown here, and four accommodations 22 for attachment of a stabilizer, not shown here.

Front-axle bracket 10 shown in FIG. 1 furthermore has four accommodations 20 for attachment of the steering gear mechanism, not shown here. Front-axle bracket 10 shown in FIG. 2, it is advantageous that two accommodations 20 are already sufficient for attachment of the steering gear mechanism, not shown here.

According to the invention, at least individual ones of the accommodations 12, 16, 20, and 22 are now integrated into the front-axle bracket 10 by way of rod-shaped connecting elements 26, in framework-like manner. Rod-shaped connecting elements 26, which essentially delimit compartments 46 without material, ensure the required rigidity without disadvantageous influence on chassis kinematics.

The rear accommodation 12, in the direction of travel FR, for mounting of each of the wheel guide elements or transverse control arms, possesses bearing accommodation elements 12a and 12b that are spaced apart, at least approximately vertical to the longitudinal vehicle axis F, for surrounding and holding the transverse control arm, not shown here, of the rear bearing, in the direction of travel FR. Such an embodiment of accommodation 12 is advantageous, but the invention is not restricted to this embodiment of accommodation 12. The possible integration of an accommodation having a different configuration into the front-axle bracket, by means of rod-shaped connecting elements, is important.

The front accommodation 14, in the direction of travel FR, for mounting of each of the wheel guide elements or transverse control arms, possesses two accommodation elements 14a and 14b spaced apart at least approximately in the longitudinal vehicle direction F, for surrounding the front bearing, in the direction of travel FR, in U shape, and holding it on the transverse control arm, not shown here.

Front-axle bracket 10 has at least one reinforcement element in the form of a horizontally disposed, level surface element 28 in the transverse direction between front accommodations 14, in the direction of travel FR, for mounting of each of the transverse control arms, which element is disposed in a plane underneath the bores 32 provided in the bearing accommodation elements 14a and 14b, and whose edge that faces in the direction of travel FR has an indentation 30 in a semi-oval shape.

Front-axle bracket 10 furthermore has an additional reinforcement rib 50, standing vertically erect here, in the transverse direction between front accommodations 14, in the direction of travel FR, or the side arms 34 that follow them, respectively, which rib makes a transition into the horizontally disposed; level surface element 28.

In the aforementioned side arms 34, a second accommodation 18 for attachment of the front-axle bracket 10 to the vehicle body is provided, in each instance.

Front-axle bracket 10 furthermore has an approximately central planar reinforcement element 36 that follows the accommodation 24 for mounting of the pendulum support, at least in part, and widens opposite the direction of travel FR, which element is delimited, at least in part, by reinforcement ribs 38. Planar reinforcement element 36 forms a type of bead 40 toward the rear edge, opposite the direction of travel FR, which is hollow on the underside and configured to be V-shaped in cross-section.

On planar reinforcement element 36, at least one reinforcement rib 44 is furthermore provided, which is disposed at least partly between the rear edge of planar reinforcement element 36 and accommodation 24 for mounting of the pendulum support, in the longitudinal vehicle direction F.

Each accommodation element 12a and 12b is now integrated into front-axle bracket 10 by way of two rod-shaped connecting elements 26. In deviation from this arrangement, the accommodation element 12a in FIG. 2 demonstrates three rod-shaped connecting elements 26.

In both the variants shown in FIGS. 1 and 2, however, accommodation element 12a is connected with the front accommodation 14, in the direction of travel FR, or with the side arm 34 that follows it, respectively, by way of a rod-shaped connecting element 26, whereby rod-shaped connecting element 26 preferably runs approximately in the longitudinal vehicle direction F.

First accommodation 16 for attachment of front-axle bracket 10 to the vehicle body is disposed in different positions in the exemplary embodiments shown in FIGS. 1 and 2, so that rod-shaped connecting elements 26 also have different linking locations, particularly with reference to accommodations 20 and 22 for attachment of the steering gear mechanism and attachment of the stabilizer.

In the exemplary embodiment shown in FIG. 2, planar reinforcement element 36 has node points 42 on the rear edge, opposite the direction of travel FR, at which multiple rod-shaped connecting elements 26 run together.

The exemplary embodiment shown in FIG. 1 shows that accommodations 20 for attachment of the steering gear mechanism and/or accommodations 22 for attachment of the stabilizer can also be linked to rod-shaped connecting elements 26 by way of crosspieces 48.

Although only at least two embodiments of the present invention have been shown and described, it is to be understood that many changes and modifications may be made thereunto without departing from the spirit and scope of the claims.

What is claimed is:

1. A front-axle bracket for a motor vehicle comprising
   (a) a one-piece bracket frame comprising a plurality of rod-shaped connecting elements;
   (b) first and second rear accommodations;
   (c) first and second front accommodations spaced apart from the first and second rear accommodations, respectively, in a longitudinal vehicle direction, the first rear accommodation and the first front accommodation being provided for pivotal mounting at bearing locations of a first wheel guide element, the second rear accommodation and the second front accommodation being provided at bearing locations for pivotal mounting of a second wheel guide element;
   (d) a plurality of vehicle body accommodations for attachment of the frame with pre-assembled assemblies as a pre-finished unit on a vehicle body; and
   (e) at least one further accommodation selected from the group consisting of at least one steering gear mechanism accommodation for attachment of a steering gear mechanism, at least one stabilizer accommodation for attachment of a stabilizer mechanism, and at least one pendulum support accommodation for mounting of a pendulum support;
   wherein the frame connects the rear accommodations, the front accommodations, the vehicle body accommodations, and the at least one further accommodation with one another and at least some accommodations selected from the group consisting of the rear accommodations, the front accommodations, the vehicle body accommodations, and the at least one further accommodation are integrated into the frame by way of the rod-shaped connecting elements.

2. The front-axle bracket according to claim 1, wherein at least two accommodations selected from the group consisting of the rear accommodations, the front accommodations, the vehicle body accommodations, and the at least one further accommodation are directly connected with one another by way of the rod-shaped connecting elements.

3. The front-axle bracket according to claim 1, wherein each rear accommodation comprises first and second rear accommodation elements spaced apart, at least approximately vertical to the longitudinal vehicle direction, for enclosing and holding a rear bearing, in a travel direction, on the wheel guide element, wherein each rear accommodation element is integrated into the frame by way of at least one of the rod-shaped connecting elements.

4. The front-axle bracket according to claim 3, wherein at least one rear accommodation element is connected, by way of a rod-shaped connecting element of the plurality of rod-shaped connecting elements, with a first vehicle body accommodation of the plurality of vehicle body accommodations.

5. The front-axle bracket according to claim 4, wherein the first vehicle body accommodation forms a rear end of the frame in the travel direction.

6. The front-axle bracket according to claim 3, wherein at least one rear accommodation element is connected, by way of a rod-shaped connecting element of the plurality of rod-shaped connecting elements, with the first front accommodation, wherein the rod-shaped connecting element runs approximately in the longitudinal vehicle direction.

7. The front-axle bracket according to claim 1, wherein the first front accommodation comprises first and second front accommodation elements spaced apart at least approximately in the longitudinal vehicle direction, for enclosing a front bearing, in a travel direction, in U shape and holding the front bearing on the first wheel guide element.

8. The front-axle bracket according to claim 1, further comprising at least one reinforcement element in a transverse direction, between the front accommodations for mounting of each of the first and second wheel guide elements.

9. The front-axle bracket according to claim 8, wherein the at least one reinforcement element comprises a horizontally disposed surface element.

10. The front-axle bracket according to claim 9, wherein the horizontally disposed surface element is configured to be level.

11. The front-axle bracket according to claim 9, wherein the horizontally disposed surface element comprises an edge facing in the travel direction having an indentation in a semi-oval shape.

12. The front-axle bracket according to claim 8, wherein the first front accommodation comprises first and second front accommodation elements, a plurality of bores are provided in the front accommodation elements, and the at least one reinforcement element comprises a horizontally disposed surface element disposed in a plane underneath the bores.

13. The front-axle bracket according to claim 1, wherein the plurality of vehicle body accommodations comprises first and second accommodations, the second accommodation being integrated into a side arm in immediate vicinity of the second front accommodation for mounting of the second wheel guide element.

14. The front-axle bracket according to claim 1, further comprising an approximately central planar reinforcement element, wherein the at least one further accommodation comprises at least one pendulum support accommodation and the planar reinforcement element at least partially follows the at least one pendulum support accommodation and widens opposite the travel direction.

15. The front-axle bracket according to claim 14, wherein the planar reinforcement element is delimited, at least in part, by a plurality of reinforcement ribs.

16. The front-axle bracket according to claim 14, wherein the planar reinforcement element forms a type of bead towards a rear edge, opposite the travel direction, said bead being configured to be hollow on an underside portion of the bead and having an upside-down V cross-section.

17. The front-axle bracket according to claim 16, wherein the planar reinforcement element has node points at the rear edge, opposite the travel direction, wherein at least individual rod-shaped connecting elements of the plurality of rod-shaped connecting elements run together in the node points.

18. The front-axle bracket according to claim 14, wherein the plurality of vehicle body accommodation elements comprises a first vehicle body accommodation connected with the planar reinforcement element by way of at least one rod-shaped connecting element of the plurality of rod-shaped connecting elements.

19. The front-axle bracket according to claim 14, further comprising at least one reinforcement rib provided on the planar reinforcement element, wherein the at least one further accommodation comprises at least one pendulum support accommodation and wherein said rib is disposed, in the longitudinal vehicle direction, at least partly between a rear edge of the planar reinforcement element and the at least one pendulum support accommodation.

20. The front-axle bracket according to claim 1, wherein the frame is produced from an aluminum alloy.

21. The front-axle bracket according to claim 1, wherein the frame is produced using an aluminum casting process.

22. The front-axle bracket according to claim 1, wherein the rod-shaped connecting elements delimit compartments having an area greater, in a top view of the frame, than the area of the frame having no passage, in a top view of the frame.

23. The front-axle bracket according to claim 1, wherein the at least one further accommodation comprises first and second steering gear mechanism accommodations.

24. The front-axle bracket according to claim 1, wherein the at least one further accommodation comprises at least one steering gear mechanism accommodation and at least one stabilizer accommodation and the at least one steering gear mechanism accommodation and the at least one stabilizer accommodation are linked with the rod-shaped connecting elements by way of crosspieces.

25. The front-axle bracket according to claim 1, wherein the rear accommodations, the front accommodations, the vehicle body accommodations, and the at least one further accommodation are connected with one another in such a manner that weight-reducing recesses in a form of at least one of perforations and cavities that are open on one side remain in the frame without any disadvantageous influence on chassis kinematics.

26. The front-axle bracket according to claim 1, wherein the frame comprises an aluminum casting alloy that contains at least five of the alloy components listed below
Si: 2.5 to 3.3 wt.-%;
Mg: 0.2 to 0.7 wt.-%;
Fe: <0.18 wt.-%;
Mn: <0.5 wt.-%;
Ti: <0.1 wt.-%;
Sr: <0.03 wt.-%;
Other: <0.1 wt.-%
whereby in addition, Cr in an amount that increases alloy strength is contained in the alloy as another alloy component, supplemented to 100 wt.-% with Al.

27. The front-axle bracket according to claim 1, wherein the frame comprises an aluminum casting alloy that contains at least five of the alloy components listed below
Si: 2.5 to 3.3 wt.-%;
Mg: 0.2 to 0.7 wt.-%;
Fe: <0.18 wt.-%;
Mn: <0.5 wt.-%;
Ti: <0.1 wt.-%;
Sr: <0.03 wt.-%;
Cr: 0.3 to 1.3 wt.-%;
Other: <0.1 wt.-%
and supplemented to 100 wt.-% with Al.

* * * * *